Sept. 15, 1936.   O. W. HUMPHREYS ET AL   2,054,544
ELECTRIC STORAGE COOKER
Filed Dec. 19, 1934   2 Sheets-Sheet 1

INVENTORS
Olliver W. Humphreys,
John R. Hunt and
BY Charles W. Stopford

M H Lockwood
ATTORNEY

Sept. 15, 1936.   O. W. HUMPHREYS ET AL   2,054,544
ELECTRIC STORAGE COOKER
Filed Dec. 19, 1934   2 Sheets-Sheet 2

INVENTORS
Oliver W. Humphreys,
John R. Hunt and
Charles W. Stopford
BY
M. H. Lockwood
ATTORNEY Patented Sept. 15, 1936

2,054,544

UNITED STATES PATENT OFFICE 2,054,544

ELECTRIC STORAGE COOKER

Olliver William Humphreys, Kenton, John Raymond Hunt, Stanmore, and Charles William Stopford, Wembley, England, assignors to The General Electric Company Limited, London, England Application December 19, 1934, Serial No. 758,204
In Great Britain January 10, 1934

4 Claims. (Cl. 219—37)

This invention relates to electric storage cookers of the type in which one part of the surface of the block is used to provide heat for operations requiring a relatively high temperature and another part of the surface is used to provide heat for operations requiring a relatively low temperature. For convenience, the two parts of the surface will hereinafter be termed "lower" and "upper" parts, but it is not necessarily implied that these terms have their geometrical meaning. Thus the lower surface of the block often forms the top of the oven and provides the heat required for roasting and grilling, which require a relatively high temperature, while the upper surface is used for boiling, which requires a relatively low temperature. Again the upper surface may be divided into two portions, of which one is used for raising the contents of vessels rapidly to the boiling temperature, while the other is used for simmering, that is to say, for keeping them at or near the boiling temperature.

In cookers of this kind there is waste of heat if both parts of the surface of the block are in close thermal connection and therefore always at the same temperature, moreover the use of the upper surface of the block for boiling may reduce the temperature of the lower surface below that required for roasting; or again the surface intended for simmering may be so hot that undesirably rapid boiling occurs. The object of the invention is to overcome these objections.

According to the invention in cookers of the type specified the part of the block which provides heat for operations requiring a relatively low temperature is of large thermal capacity and is connected to the main portion of the block by a path of lower thermal conductivity than the part of the surface which provides heat for operations requiring a relatively high temperature. By the main part of the block we mean that immediately surrounding the heating elements in which heat is generated during periods when the cooker is not being used and not just about to be used, that is to say when heat is being stored. Heating elements may be present in parts of the block other than the main part, as described below; but, if so, they must not be adapted to generate a substantial portion of the stored heat. The thermal capacity of the part of the block providing heat for operations requiring a relatively low temperature will be said to be large for the purposes of the invention if, under normal storage conditions, an appreciable quantity of heat, such, for example, as that required to cook a meal, can be withdrawn from that part of the block without substantially affecting the temperature of the main part of the block.

The path of lower thermal conductivity may be provided by inserting a thermal insulator (which may be an air gap and may include reflectors) into the path between the main block and the part used for low temperature operations. This arrangement has subsidiary advantages, since the block is divided into two portions that can be moved relatively to each other.

Certain embodiments of the invention will now be described by way of example with reference to the accompanying drawings which show in section the essential details of the cooker, but in which is omitted much of what is unessential to the invention.

Figure 1:
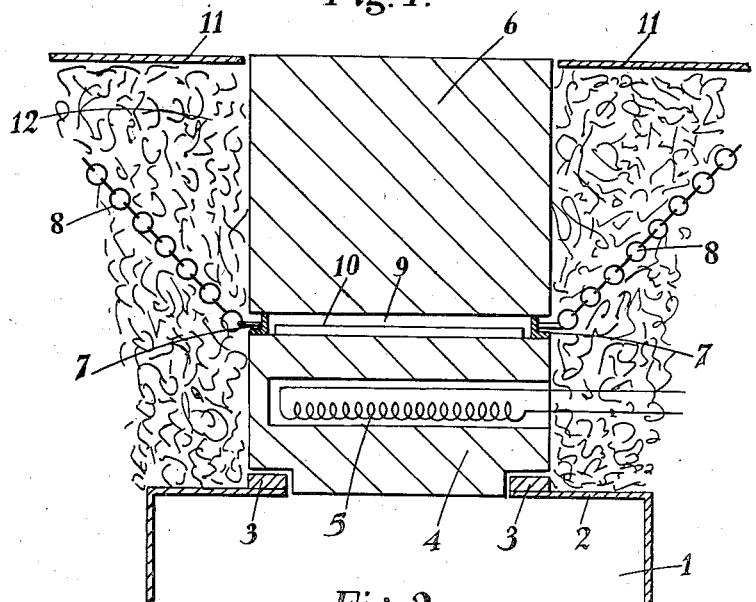
Fig. 1 is a vertical sectional view of the preferred form of the invention.

In Figure 1, the top 2 of the oven 1 carries on insulating pieces 3 the main part 4 of the storage block. This part contains the heating element 5. The upper part 6 of the block, which contains no heating elements, rests on a frame 7 supported from the upper part of the main frame of the cooker by chains 8, which do not conduct away much of the heat. There is an air space 9 between the lower part 4 and the upper part 6, which air space is the thermal insulator aforementioned. In it there is arranged the reflecting sheet 10 of aluminium, which reduces still further the flow of heat between 4 and 6. The upper part 6 is surrounded by the hob 11; the sides of the blocks are surrounded by slag wool 12, providing thermal insulation.

When the oven is out of use, heat is generated in the element 5 and communicated directly to the main part 4; but some of it flows across the air space 9 and heats the upper part 6. Consequently the part 4 is raised to a temperature appropriate for roasting in the oven or for grilling materials placed immediately below the part 4, while the part 6 is raised to a lower temperature appropriate for boiling.

Figure 2:
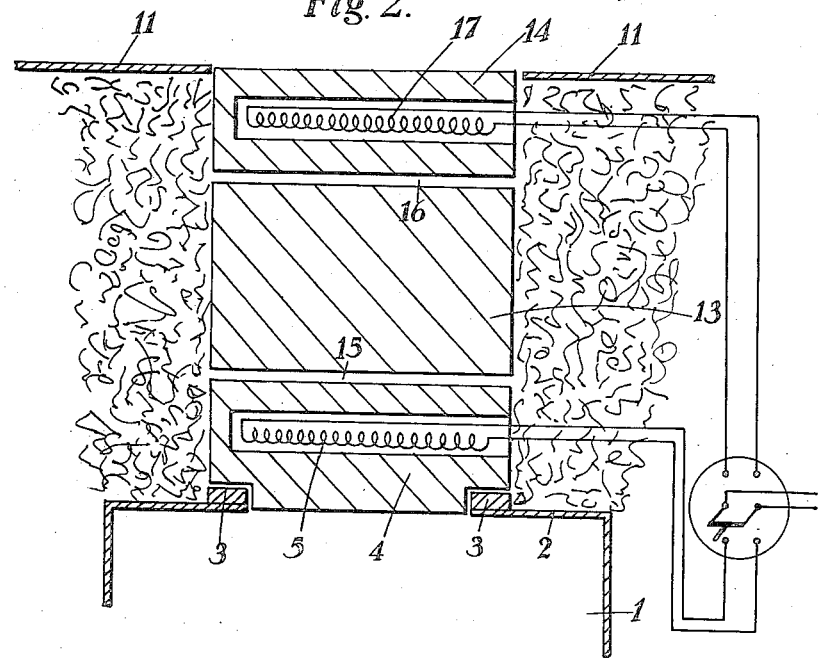
Fig. 2 is a vertical section of another modification.

In Figure 2 the parts denoted by 1, 2, 3, 4 and 5 are similar to those similarly denoted in Figure 1. But there are now two other parts of the block above the main part 4. Part 13 is a part containing no heating element, separated from the part 4 below and the part 14 above by air gaps 15, 16.

The uppermost part 14, surrounded by the hob 11, contains another heating element 17, which can be switched into circuit in substitution for the element 5. When heat is being generated and stored, element 5 is in circuit; the part 4 is raised to a high temperature and the part 14 to a lower temperature. But if the cooker has to be heated up from cold, and boiling is the first operation to be performed, the element 17 is switched on first. The part 14 is then raised rapidly to a temperature at which boiling can be performed, without the need for waiting until the other parts of the block are heated up. When the part 14 has been raised to the boiling temperature, the element 5 is switched on in place of the element 17, and the other parts of the block are heated.

It will be seen that in these arrangements the two parts of the block are movable relatively to each other. The lower part may be fixed relatively to the oven and yet the upper part adjusted relatively to the hob. Further there has to be no tight joint between the upper part (used for boiling) and the oven, in order to prevent spilt liquid from penetrating into the oven. In the arrangement of Figure 1, but not in that of Figure 2, these advantages are secured without the introduction of heating elements that are not fixed permanently relatively to the frame of the cooker.

Figure 3:
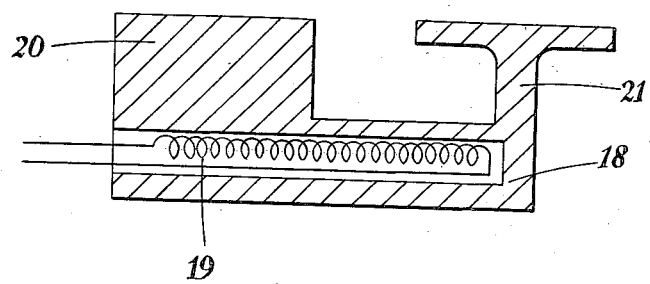
Fig. 3 is an elevation in section of a double-burner form of the invention.
Figure 4:
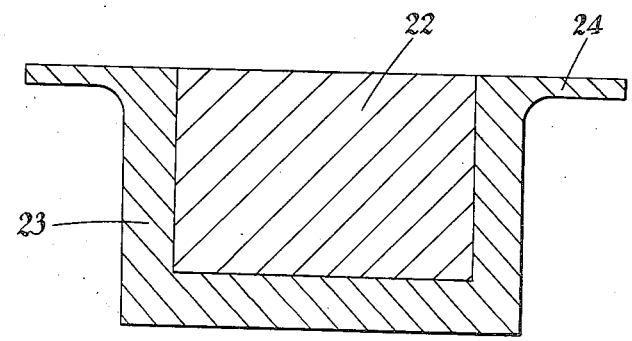
Fig. 4 is a sectional elevation of a modified form of the two-surfaced cooker.

Figures 3 and 4 show blocks which may be arranged above the blocks 14 and 6 respectively, when of suitable dimensions. Here, two parts of the upper surface of the block both of approximately the same area are arranged to be at different temperatures for boiling or simmering operations respectively. This is achieved in Figure 3 by removing portions of the block, so that the cross-sectional area of the parts connecting these surfaces with the main part of the block is different. (When a portion of the block is said to be removed, it is not implied that this portion was actually present originally and was cut away; it is implied only that the shape of the block is such as might have been produced by cutting away a portion of it.) Thus 18 is the main portion of the block containing the heating element 19; a portion 20 of large cross-sectional area connects the main block with the surface intended for boiling, while a portion 21 of small cross-sectional area connects the main block with the surface intended for simmering.

The same results may be achieved by filling up the portions of the block that are removed in Figure 3 and reducing the thermal conductivity of the path leading to the simmering surface by boring holes in the metal just beneath it or by interposing a layer of a thermal insulator.

In the arrangement shown in Figure 4, advantage is taken of the different thermal conductivities of two metals, say iron and aluminium. The main portion of the block is the part 22 which is made of aluminium, which has a relatively high thermal conductivity, and contains a heating element (not shown) if desired. It is contained in a vessel 23 of cast iron, having a relatively low thermal conductivity provided with a wide flange 24. The maximum rate of flow of heat from the flange 24 is then less than that from the surface of the block 22; the former forms the simmering surface and the latter the boiling surface.

We claim:—

1. An electric storage cooker comprising an oven and a hob suitably spaced one above the other, a heat storage block therebetween comprising at least two parts having the same cross-sectional area and mounted one above the other, the upper surface of the upper part of said block being arranged for boiling and like operations and the lower surface of the lower part of the block being arranged for heating the oven, means cooperating with the hob for supporting said boiling part of the block with its upper surface in the plane of the hob and with its lower surface in spaced relation to but arranged to receive heat from said oven part of the block, means for supporting said oven part of the block with its lower surface in position for discharging heat into the oven, an electric heating element within said oven part of the block for heating the same and also supplying heat to said boiling part and heat insulating means between said block parts for controlling the relative amount of heat to be transferred from the heated oven part to said boiling part.

2. An electric storage cooker as in claim 1 wherein said heat storage block is provided with heating elements in said boiling part and in said oven part and circuits and switching means are arranged for placing the respective heating elements in operation.

3. An electric storage cooker as in claim 1 wherein the insulating means between the parts of the heat storage block is exclusively air.

4. An electric storage cooker as in claim 1 wherein said insulating means between the parts of the heat storage block comprises a sheet metal reflecting plate.

OLLIVER WILLIAM HUMPHREYS.
JOHN RAYMOND HUNT.
CHARLES WILLIAM STOPFORD.